US006378856B1

(12) United States Patent
Takahashi

(10) Patent No.: US 6,378,856 B1
(45) Date of Patent: Apr. 30, 2002

(54) CLAMP APPARATUS

(75) Inventor: Kazuyoshi Takahashi, Tokyo (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/592,732

(22) Filed: Jun. 13, 2000

(30) Foreign Application Priority Data

Jun. 17, 1999 (JP) ........................................ 11-170916

(51) Int. Cl.[7] ........................................ B23Q 3/08
(52) U.S. Cl. ........................................ 269/32
(58) Field of Search ........................ 269/32, 25, 27, 269/228, 285

(56) References Cited

U.S. PATENT DOCUMENTS

| | | | | |
|---|---|---|---|---|
| 3,977,355 A | * | 8/1976 | Lorenz et al. | 116/34 R |
| 5,575,462 A | | 11/1996 | Blatt | |
| 5,996,984 A | | 12/1999 | Takahashi | |

* cited by examiner

*Primary Examiner*—Robert C. Watson
(74) *Attorney, Agent, or Firm*—Oblon, Spivak, McClelland, Maier & Neustadt, P.C.

(57) ABSTRACT

A toggle link mechanism has a releasing projection which protrudes from an opening formed in a body when it is displaced integrally with a piston rod. The body is provided with a cap for closing the opening and covering the releasing projection.

11 Claims, 11 Drawing Sheets

CLAMP APPARATUS

BACKGROUND OF THE INVENTION

1. Field of the Invention

The present invention relates to a clamp apparatus capable of clamping a workpiece at a predetermined position by using an arm which is rotatable by a predetermined angle in accordance with a driving action of a driving section.

2. Description of the Related Art

The clamp cylinder has been hitherto used, for example, in order to clamp a constitutive part when the constitutive part of an automobile or the like is welded. Such a clamp cylinder is disclosed, for example, in U.S. Pat. No. 5,575,462.

The clamp cylinder disclosed in U.S. Pat. No. 5,575,462 is shown in FIG. 11. A piston rod 1, which is displaced in the axial direction in accordance with the driving action of an unillustrated cylinder, is arranged in a housing 2. A coupling member 3 is connected to one end of the piston rod 1.

A toggle link mechanism 6 including a link plate 5 is coupled to the coupling member 3 via a pin member 4. A release pin 7, which abuts against the coupling member 3, is provided displaceably along a hole 8 at one end of the housing 2.

The release pin 7 functions as follows. That is, when the release pin 7 is manually pressed downwardly by an operator in a state in which a workpiece is clamped by an unillustrated arm, then the coupling member 3 is displaced downwardly (see two-dot chain lines in FIG. 11), and the clamping state is canceled to make restoration to an initial position which resides in an unclamping state.

However, in the case of the clamp cylinder disclosed in U.S. Pat. No. 5,575,462 described above, for example, when the clamped workplace (unillustrated) is welded, foreign matters such as sputter make invasion into the hole 8 in which the release pin 7 makes displacement, or the dust or the like invaded into the gap between the release pin 7 and the hole 8 is accumulated. As a result, it is feared that the displacement of the release pin 7 is obstructed.

Further, the dust or the like makes invasion into the inside of the housing 2 via the gap between the release pin 7 and the hole 8. As a result, it is feared that the sliding friction of the toggle link mechanism 6 or the like is increased, and the durability of the toggle link mechanism 6 or the like is deteriorated.

SUMMARY OF THE INVENTION

A general object of the present invention is to provide a clamp apparatus which makes it possible to reliably avoid the invasion of foreign matters into the inside of a body, reduce the number of parts, and decrease the production cost.

A principal object of the present invention is to provide a clamp apparatus which makes it possible to improve the durability of the entire apparatus including a toggle link mechanism by avoiding the increase in sliding resistance resulting from foreign matters which would make invasion into the inside of a body.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The clamp apparatus according to the present invention will be exemplified by preferred embodiments, which will be explained in detail below with reference to the accompanying drawings.

Figure 1:
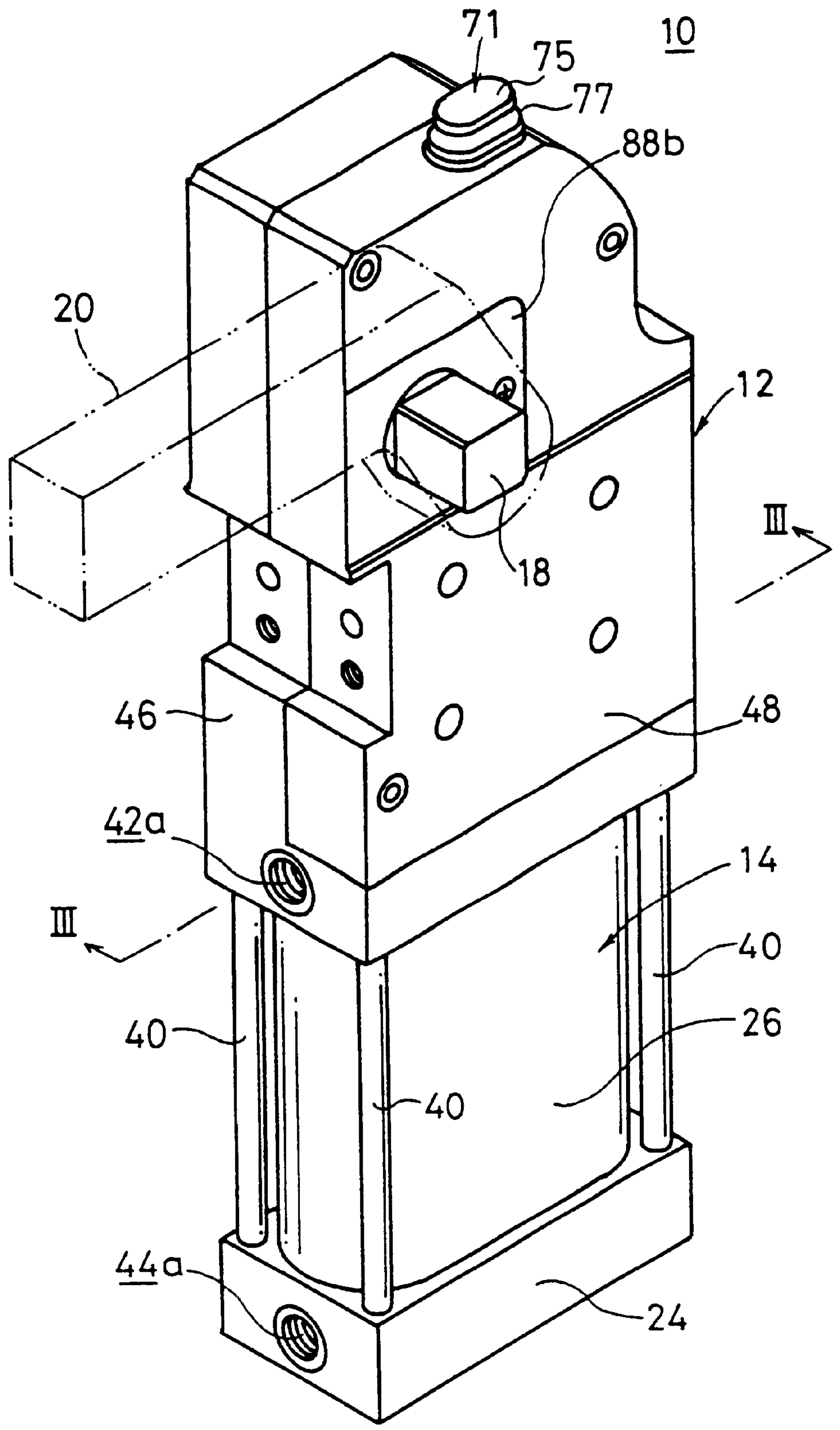
FIG. 1 shows a perspective view illustrating a clamp apparatus according to an embodiment of the present invention.

With reference to FIG. 1, reference numeral 10 indicates a clamp apparatus according to an embodiment of the present invention. The clamp apparatus 10 comprises a body 12 which is formed to have a flat configuration in an integrated manner, a driving section (driving mechanism) 14 which is coupled in an air-tight manner to the lower end of the body 12, and an arm 20 which is coupled to a rectangular bearing section 18 protruding to the outside through a pair of substantially circular openings 16*a*, 16*b* (see FIG. 4) formed through the body 12.

Figure 5:
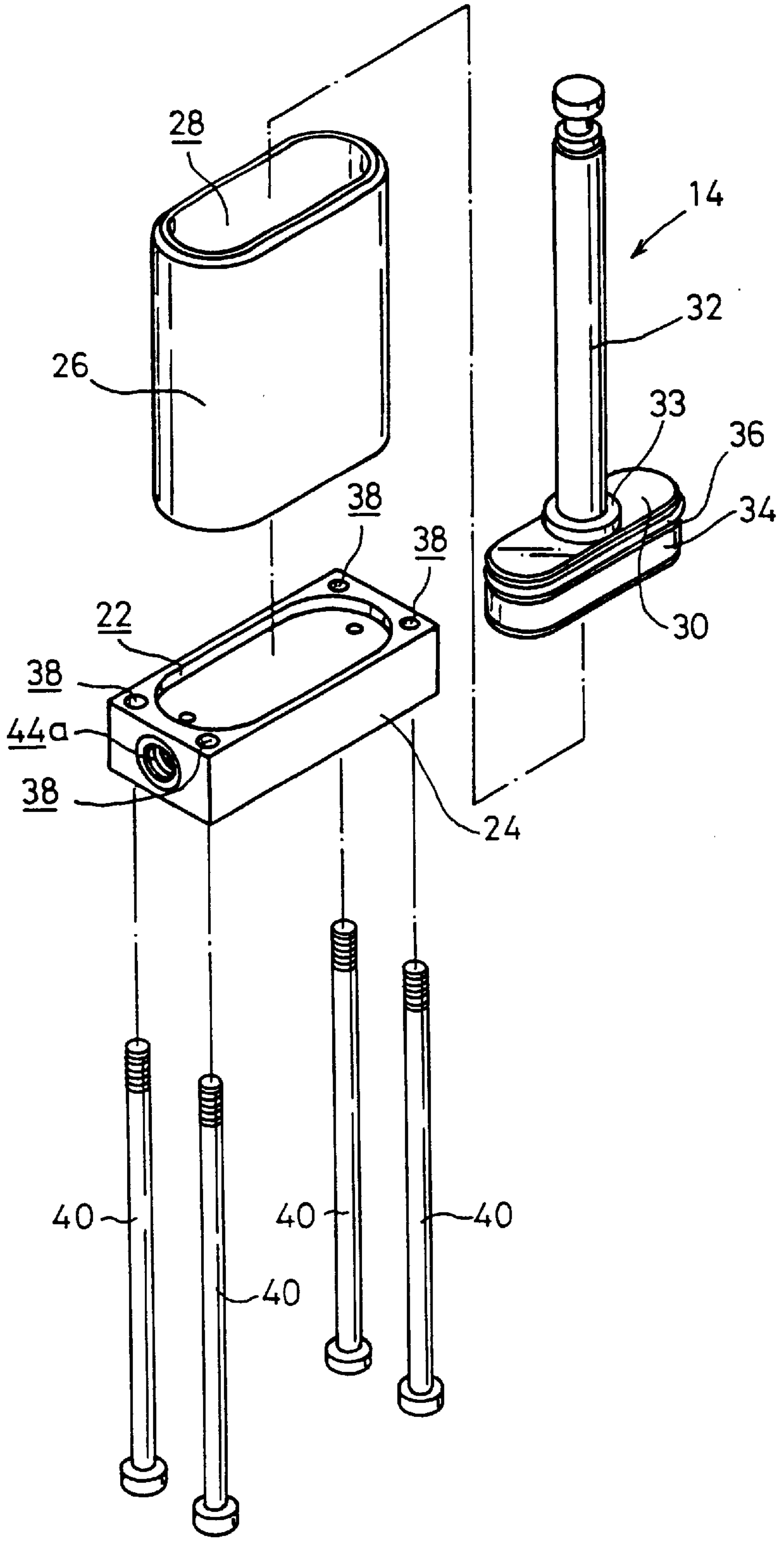
FIG. 5 shows an exploded perspective view illustrating a driving section for constructing the clamp apparatus.

As shown in FIG. 5, the driving section 14 includes an end block 24 which has an elliptic recess 22 formed on its upper surface, and a cylinder tube 26 which is composed of a cylinder having an elliptic cross section with its first end coupled in an air-tight manner to the recess 22 of the end block 24 and with its second end coupled in an air-tight manner to the bottom surface of the body 12.

Figure 3:
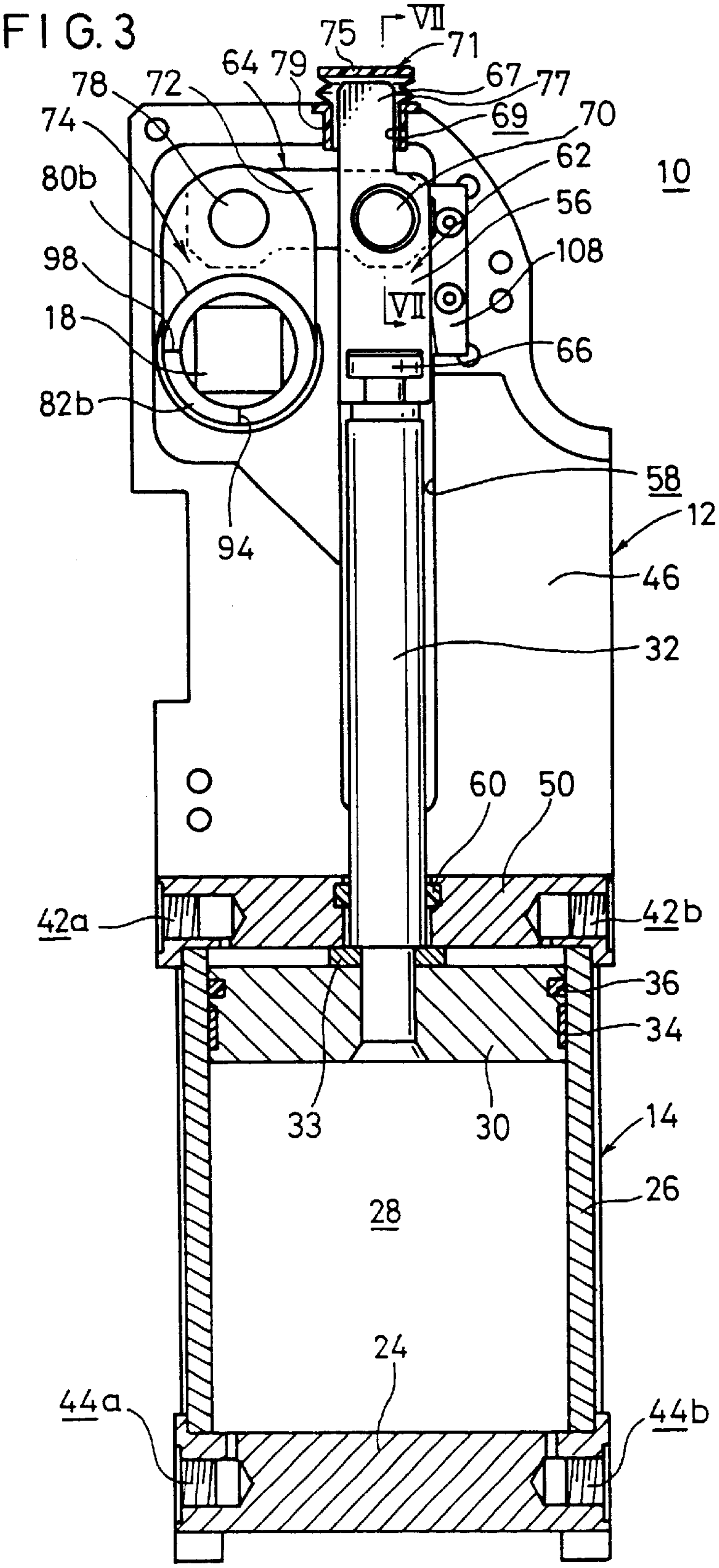
FIG. 3 shows a longitudinal sectional view taken along a line III—III shown in FIG. 1.

As shown in FIGS. 3 and 5, the driving section 14 further comprises a piston 30 which is accommodated in the cylinder tube 26 and which makes reciprocating movement along a cylinder chamber 28, a piston rod (rod member) 32 which is coupled to a central portion of the piston 30 and which is displaceable integrally with the piston 30, and a ring-shaped spacer 33 which is provided at the connecting portion between the piston 30 and the piston rod 32 and which is externally fitted to the piston rod 32 via a hole.

The spacer 33 is made of a metal material such as aluminum. The spacer 33 abuts against the wall surface of a projection 50 for forming the upper portion of the cylinder chamber 28 at the terminal end position of the displacement of the pinto 30, and thus it functions as a stopper for regulating the displacement of the piston 30. Alternatively, the piston 30 and the spacer 33 may be formed to be integrated into one unit.

As shown in FIGS. 3 and 5, a wear ring 34 and a seal ring 36 are installed to the outer circumferential surface of the piston 30 respectively. Attachment holes 38 are bored through four corner portions of the end block 24. The end block 24 and the cylinder tube 26 are assembled in an air-tight manner to the body 12 by the aid of four shafts 40 inserted through the attachment holes 38. Pairs of pressure fluid inlet/outlet ports 42*a*, 42*b*, 44*a*, 44*b*, which are used to introduce and discharge the pressure fluid (for example, compressed air) with respect to the cylinder chamber 28 respectively, are formed mutually opposingly in the body 12 and the end block 24 respectively (see FIG. 3).

When the clamp apparatus 10 is practically used, unillustrated blank caps are screwed into any pair of the pressure fluid inlet/outlet ports 42*a*, 44*a* (or 42*b*, 44*b*). Thus, the clamp apparatus 10 is used in a state in which one of the pairs of pressure fluid inlet/outlet ports 42*a*, 44*a* (or 42*b*, 44*b*) are closed.

Figure 4:
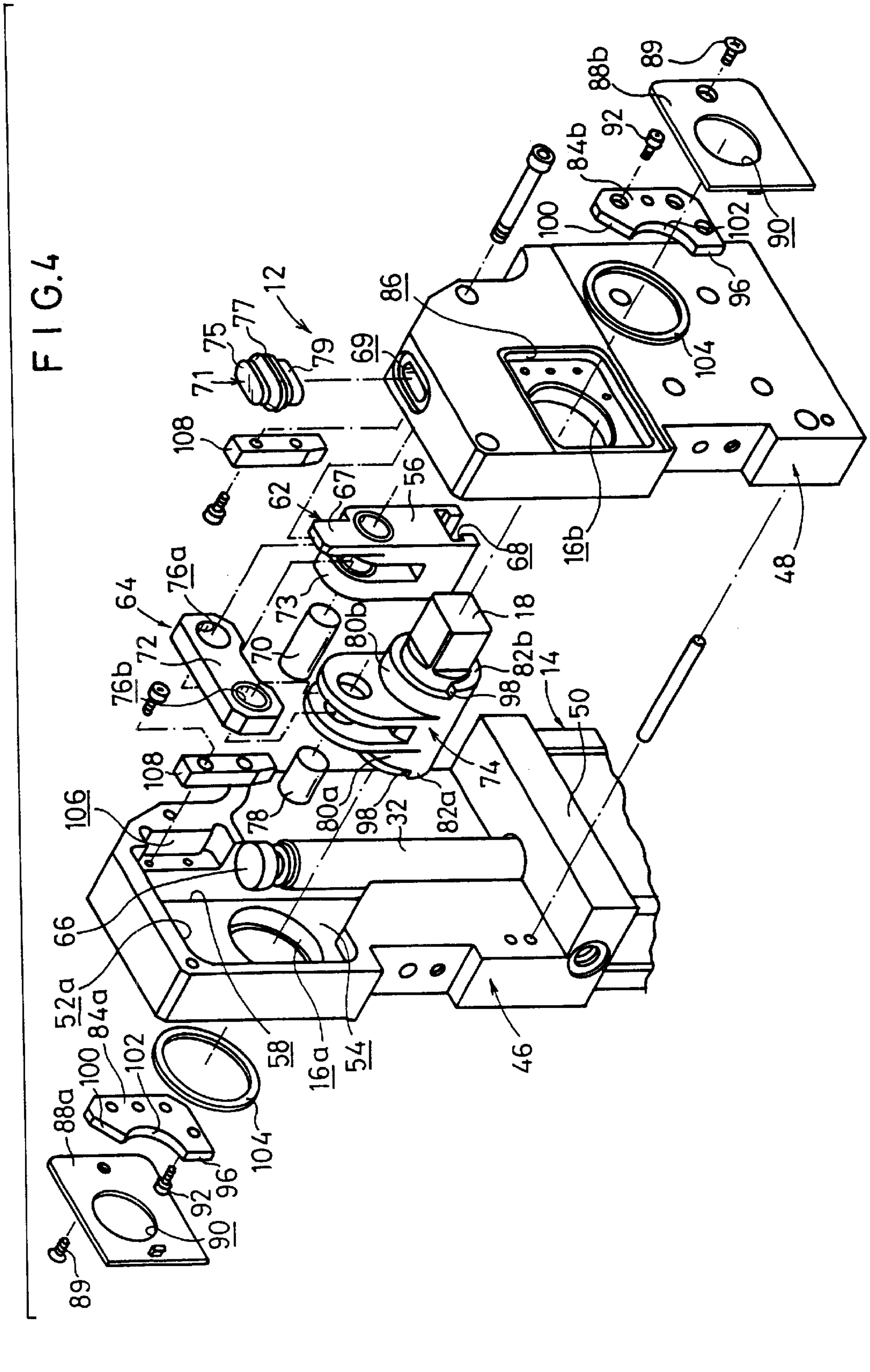
FIG. 4 shows an exploded perspective view illustrating the body for constructing the clamp apparatus.

As shown in FIG. 4, the body 12 comprises a first casing 46 and a second casing 48, which are asymmetric and are assembled in an integrated manner. A projection 50, which protrudes in a substantially horizontal direction and which functions as a rod cover, is formed in an integrated manner at the lower end of the first casing 46. The second casing 48 is formed to have a size in the longitudinal direction which is shortened by a thickness of the projection 50 as compared with the first casing 46. In this arrangement, as shown in FIG. 4, the second casing 48 can be detached from the first casing 46 without disassembling the driving section 14. Thus, it is convenient and easy to perform the disassembling operation for the body 12.

As shown in FIG. 4, a chamber 54 is formed in the body 12 by recesses 52*a*, 52*b* formed for the first casing 46 and the second casing 48 respectively (the recess 52*b* is omitted from the illustration because it has the same structure as that of the recess 52*a*). The free end of the piston rod 32 is provided to face in the chamber 54. In this arrangement, the piston rod 32 is guided linearly reciprocatively by the aid of guide grooves 58 which are formed on the inner wall surfaces of the first casing 46 and the second casing 48 respectively and on which a knuckle block 56 is slidable as described later on. A rod packing 60 (see FIG. 3) for surrounding the outer circumferential surface of the piston rod 32 is provided at a through-hole formed in the projection 50.

As shown in FIG. 4, a toggle link mechanism 64, which is used to convert the rectilinear motion of the piston rod 32 into the rotary motion of the arm 20 by the aid of a knuckle joint 62, is provided at a first end of the piston rod 32. The knuckle joint 62 comprises a knuckle block 56 having a forked section with branches separated by a predetermined spacing distance and branched substantially in parallel to one another, and a knuckle pin 70 for being rotatably attached to a hole formed in the forked section.

Figure 7:
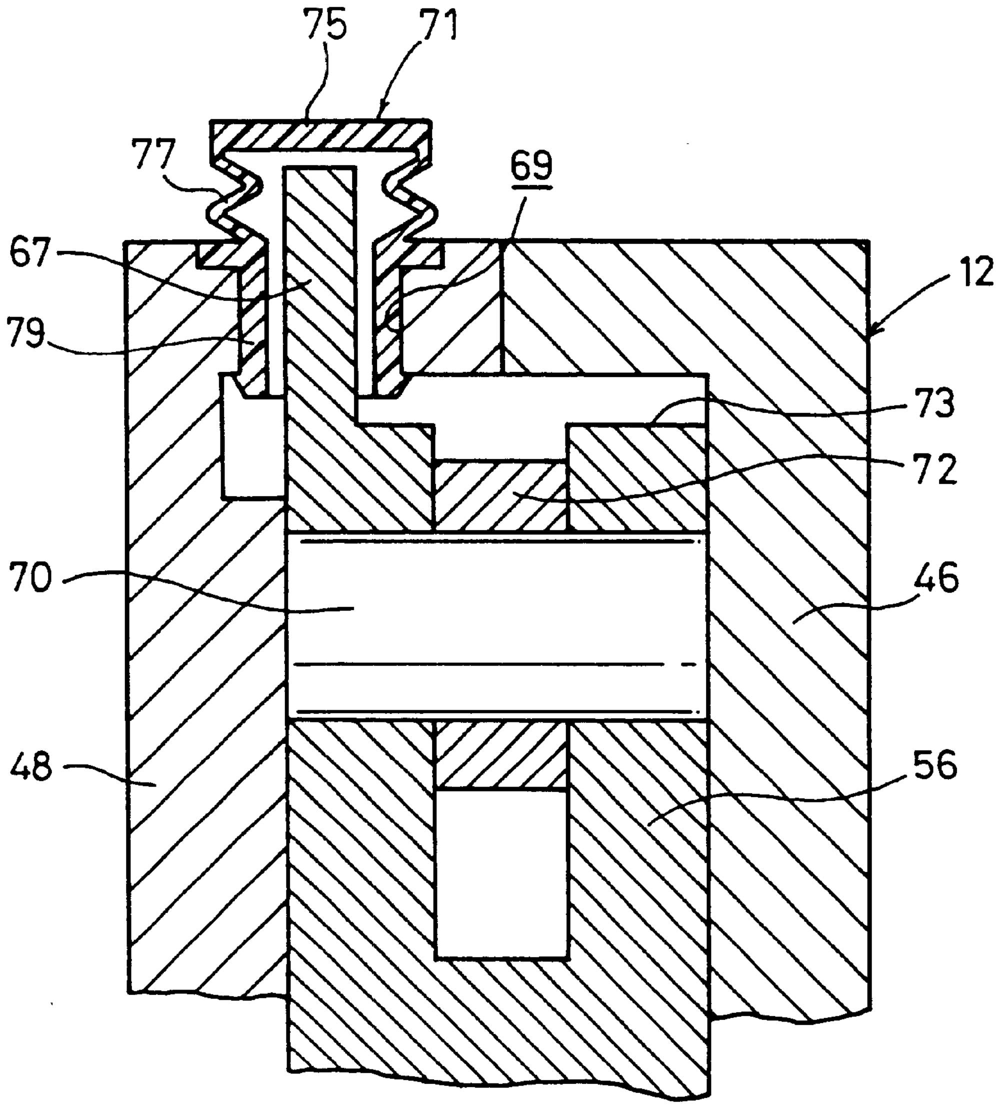
FIG. 7 shows a longitudinal sectional view taken along a line VII—VII shown in FIG. 3.

A releasing projection 67 having a flat plate-shaped configuration, which protrudes upwardly, is integrally formed on one of the branches of the forked section of the knuckle block 56 (see FIGS. 4 and 7). The releasing projection 67 is provided so that it protrudes by a predetermined length from an opening (hole) 69 having a substantially elliptic configuration formed at an upper surface portion of the second casing 48 when a workpiece is clamped by the arm 20 (see FIG. 7).

As shown in FIG. 7, a cap (seal mechanism) 71, which is made of an elastic material such as those made of synthetic resin or rubber, is installed to the opening 69. The cap 71 comprises a ceiling section 75 which is formed to have an elliptic configuration, a bellows section 77 which is formed to be telescopic, and a cylindrical section 79 which is inserted into the opening 69. The ceiling section 75, the bellows section 77, and the cylindrical section 79 are formed in an integrated manner (see FIGS. 1, 2 and 4).

In this arrangement, the cap 71 covers the releasing projection 67 which protrudes by the predetermined length upwardly from the opening 69. The cap 71 closes the opening 69 so that no dust or the like makes invasion into the inside of the body 12 (see FIG. 7).

The clamping state can be canceled to make restoration into the unclamping state by an operator, for example, by means of manual operation by pressing the elastic cap 71 to displace the releasing projection 67 downwardly.

As shown in FIG. 7, when the workpiece is clamped, the other upper surface portion 73 of the forked section of the knuckle block 56, on which the releasing projection 67 is not formed, does not abut against the Inner wall surface of the body 12. A predetermined clearance is provided between the upper surface portion 73 and the inner wall surface of the body 12.

As shown in FIG. 4, a groove 68 having a T-shaped cross section, with which a disk-shaped projection 66 of the piston rod 32 is engaged, is formed at a bottom surface portion of the knuckle block 56 to extend in a substantially horizontal direction. In this arrangement, predetermined clearances are formed between the groove 68 and the projection 66 formed integrally with the piston rod 32 and between the knuckle block 56 and the guide groove 58. The knuckle block 56 is provided slidably substantially horizontally along the groove 68. Thus, the piston rod 32 does not receive any load In the lateral direction. In other words, by providing the degree of freedom for the knuckle block 56, for example, when a workpiece is clamped, then no lateral load is applied to the piston rod 32 and the rod packing 60 or the like, and the stroke of the piston rod 32 can be efficiently transmitted to the toggle link mechanism 64.

As shown in FIG. 4, the toggle link mechanism 64 includes a link plate 72 which is coupled to the forked section of the knuckle joint 62 by the aid of a knuckle pin 70, and a support lever 74 which is rotatably supported by the pair of substantially circular openings 16*a*, 16*b* formed through the first casing 46 and the second casing 48 respectively.

The link plate 72 is allowed to intervene between the knuckle joint 62 and the support lever 74, and it functions to link the knuckle joint 62 and the support lever 74. Specifically, the link plate 72 is formed with a pair of holes 76*a*, 76*b* which are separated from each other by a predetermined spacing distance. The link plate 72 is coupled to the free end of the piston rod 32 via the knuckle joint 62 and the knuckle pin 70 rotatably attached to the first hole 76*a*. The link plate 72 is coupled to the forked section of the support lever 74 via a pin member 78 rotatably attached to the second hole 76*b*.

As shown in FIG. 4, the support lever 74 includes a forked section which is formed with holes for rotatably attaching the pin member 78, the bearing section 18 which is formed to protrude in a direction substantially perpendicular to the axis of the piston rod 32 and which has a rectangular cross section exposed to the outside from the body 12 through the opening 16*b*, a pair of circumferential sections 80*a*, 80*b* which are formed adjacently with the forked section interposed therebetween and which are fitted to the substantially circular openings 16*a*, 16*b* of the body 12 respectively, and a pair of circular arc-shaped projections 82*a*, 82*b* which are formed to slightly protrude in the lateral direction from the circumferential sections 80*a*, 80*b* and which are exposed to the outside from the body 12 through the openings 16*a*, 16*b* respectively. The arm 20 for claiming the unillustrated workpiece is detachably installed to the bearing section 18.

The support lever 74 is provided to make the rotary action integrally with the arm 20. The circular arc-shaped projections 82*a*, 82*b*, which are formed on the support lever 74, abut against plates 84*a* 84*b* fixed to the body 12 (as described later on). Accordingly, the circular arc-shaped projections 82*a*, 82*b* function as the stopper for stopping the rotary action of the arm 20.

The rectilinear motion of the piston rod 32 is transmitted to the support lever 74 via the knuckle joint 62 and the link plate 72. The support lever 74 is provided rotatably by a predetermined angle about the center of rotation of the circumferential sections 80*a*, 80*b* which are supported by the pair of openings 16*a*, 16*b* formed through the body 12.

As shown in FIG. 4, oblong recesses 86 are formed on the side surfaces of the first casing 46 and the second casing 48 for constructing the body 12 respectively. The recesses 86 are closed by a pair of cover members 88*a*, 88*b*. The cover members 88*a*, 88*b* are installed detachably by the aid of screw members 89. In this arrangement, the bearing section 18 of the support lever 74 is provided to be exposed to the outside through a substantially circular opening 90 which is formed at a substantially central portion of the cover member 88*b*.

The circular arc-shaped projections 82*a*, 82*b* of the support lever 74 abut against the wall surfaces of the recesses 86, so that the plates 84*a*, 84*b* are fixed on the wall surfaces of the recesses 86 by the aid of screw members 92 to stop the rotary action of the arm 20.

Figure 6:
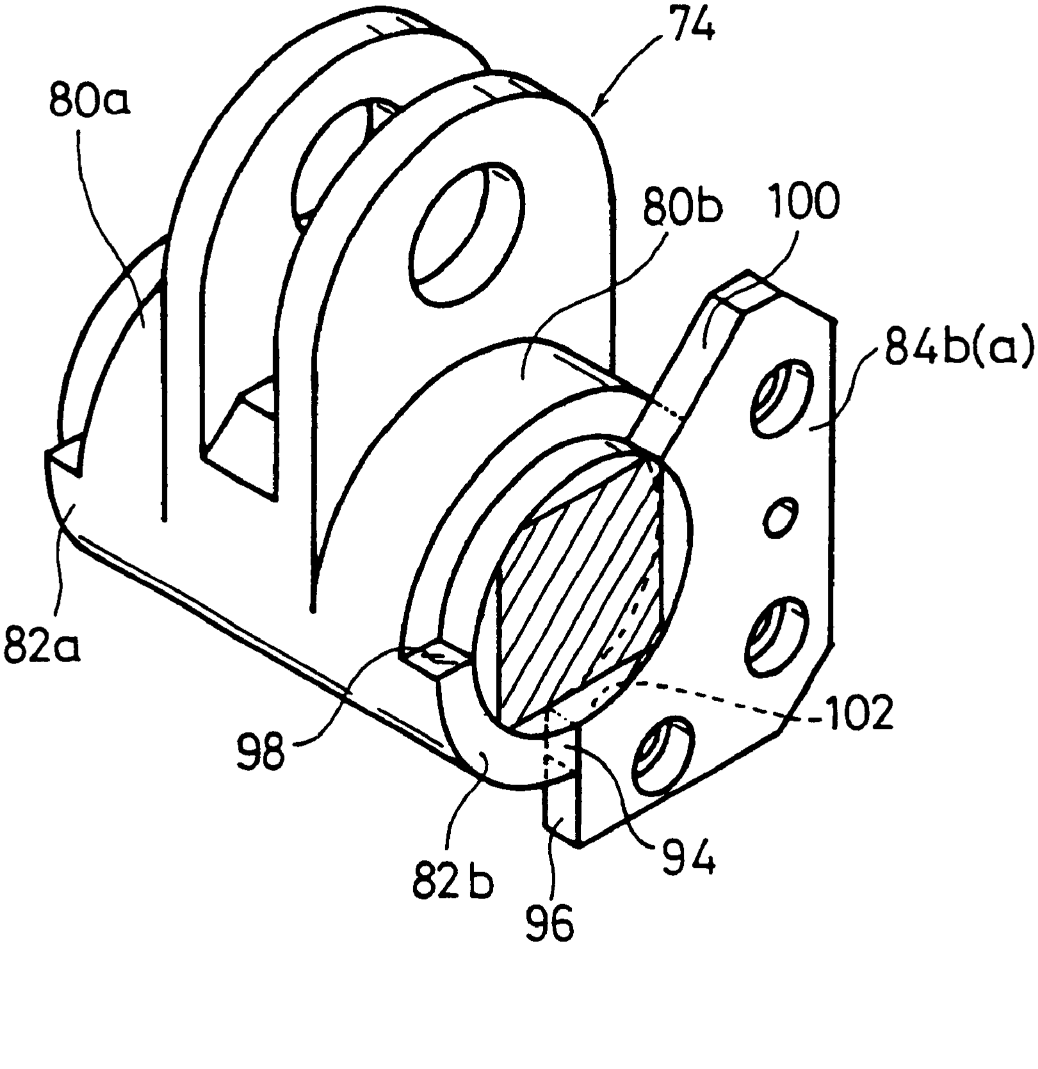
FIG. 6 shows, with partial cutout, a state in which a circular arc-shaped projection of a support lever abuts against a plate.

As shown in FIG. 6, the plate 84*b* (84*a*) has a first abutment surface 96 for making abutment against a first end surface 94 of the circular arc-shaped projection 82*b* (82*a*), and a second abutment surface 100 for making abutment against a second end surface 98 of the circular arc-shaped projection 82*b* (82*a*). A curved surface 102 for surrounding the support lever 74 is formed between the first abutment surface 96 and the second abutment surface 100. The first end surface 94 and the second end surface 98 of the support lever 74 are formed so that they are separated from each other by an angle of about 90 degrees. It is a matter of course that the angle of separation between the first end surface 94 and the second end surface 98 of the support lever 74 is not limited to 90 degrees.

Figure 2:
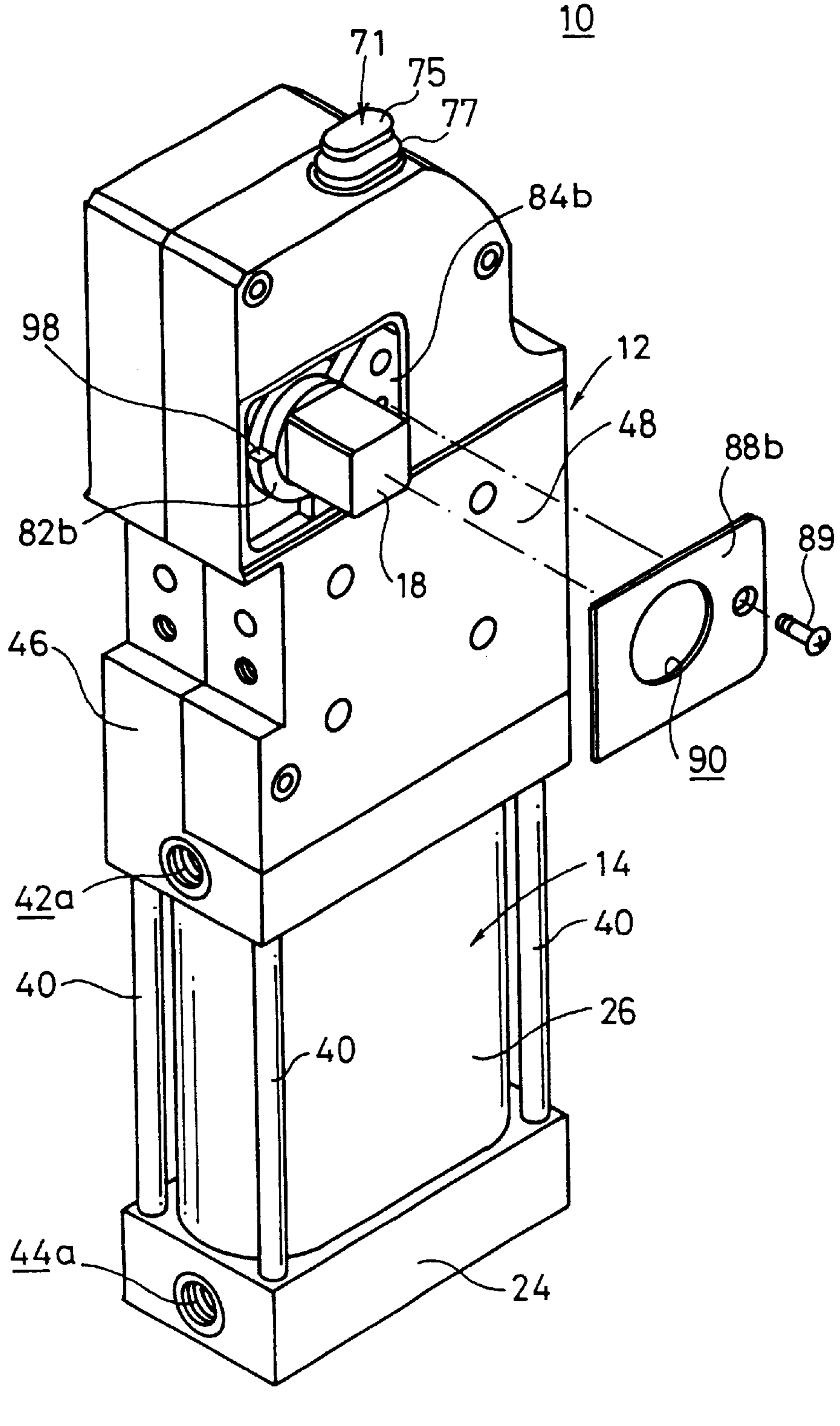
FIG. 2 shows a perspective view illustrating a state in which a cover member is detached from a body of the clamp apparatus.

In this arrangement, the pair of plates 84*a*, 84*b* can be conveniently exchanged with other plates (as described later on) with ease by detaching the pair of cover members 88*a*, 88*b* from the body 12 respectively, and loosening the screw members 92. When the pair of cover members 88*a*, 88*b* are detached from the body 12 respectively, the first end surface 94 and the second end surface 98 of the circular arc-shaped projection 82*b* (82*a*) formed on the support lever 74 are exposed to the outside as shown in FIG. 2 (however, the first end surface 94 is not shown).

As shown in FIG. 4, recesses 106 having a rectangular cross section are formed on upper side portions of the inner wall surfaces of the first casing 46 and the second casing 48 for constructing the body 12 respectively. A pair of reaction force-receiving plates 108, which are used to receive the reaction force by making abutment against the knuckle joint 62 when the clamping state is given, are fixed to the recesses 106 by the aid of screw members. The pair of guide grooves 58, which are composed of rectangular grooves and which extend in the vertical direction, are provided mutually opposingly on the inner wall surfaces of the first casing 46 and the second casing 48. The knuckle block 56 is interposed between the pair of guide grooves 58. The knuckle block 56 is provided slidably in the vertical direction in accordance with the guiding action of the guide grooves 58.

The clamp apparatus 10 according to the embodiment of the present invention is basically constructed as described above. Next, its operation, function, and effect will be explained.

At first, the clamp apparatus 10 is fixed to a predetermined position by the aid of an unillustrated fixing means. First ends of pipes such as unillustrated tubes are connected to the pair of pressure fluid inlet/outlet ports 42*a*, 44*a* (or 42*b*, 44*b*) respectively. Second ends of the pipes are connected to an unillustrated pressure fluid supply source. The following description will be made assuming that the initial position in the unclamping state is given when the piston 30 is located at the lowermost position of the cylinder chamber 28.

After performing the preparatory operation as described above, the unillustrated pressure fluid supply source is energized at the initial position to introduce the pressure fluid from the first pressure fluid inlet/outlet port 44*a* into the cylinder chamber 28. The piston 30 is pressed in accordance with the action of the pressure fluid introduced into the cylinder chamber 28. The piston 30 is moved upwardly along the cylinder chamber 28. During this process, the guiding action is effected by the wear ring 34 which is installed to the outer circumferential surface of the piston 30 and the guide groove 58 on which the knuckle block 56 makes the sliding displacement. Accordingly, the linear accuracy is maintained for the piston 30, the piston rod 32, and the knuckle block 56.

The rectilinear motion of the piston 30 is transmitted to the toggle link mechanism 64 via the piston rod 32 and the knuckle joint 62, and it is converted into the rotary motion of the arm 20 in accordance with the rotary action of the support lever 74 which constitutes the toggle link mechanism 64.

That is, the rectilinear motion (upward movement) of the piston 30 allows the force to act so that the link plate 72 and the knuckle joint 62 engaged with the free end of the piston rod 32 are pressed in the upward direction. Owing to the pressing force exerted on the link plate 72, the link plate 72 is rotated by a predetermined angle about the support point of the knuckle pin 70, and the support lever 74 is rotated in accordance with the linking action of the link plate 72.

Therefore, the arm 20 is rotated by a predetermined angle about the support point of the bearing section 18 of the support lever 74. Accordingly, the circular arc-shaped projection 82*b* (82*a*) is rotated by the predetermined angle integrally with the support lever 74.

Figure 8:
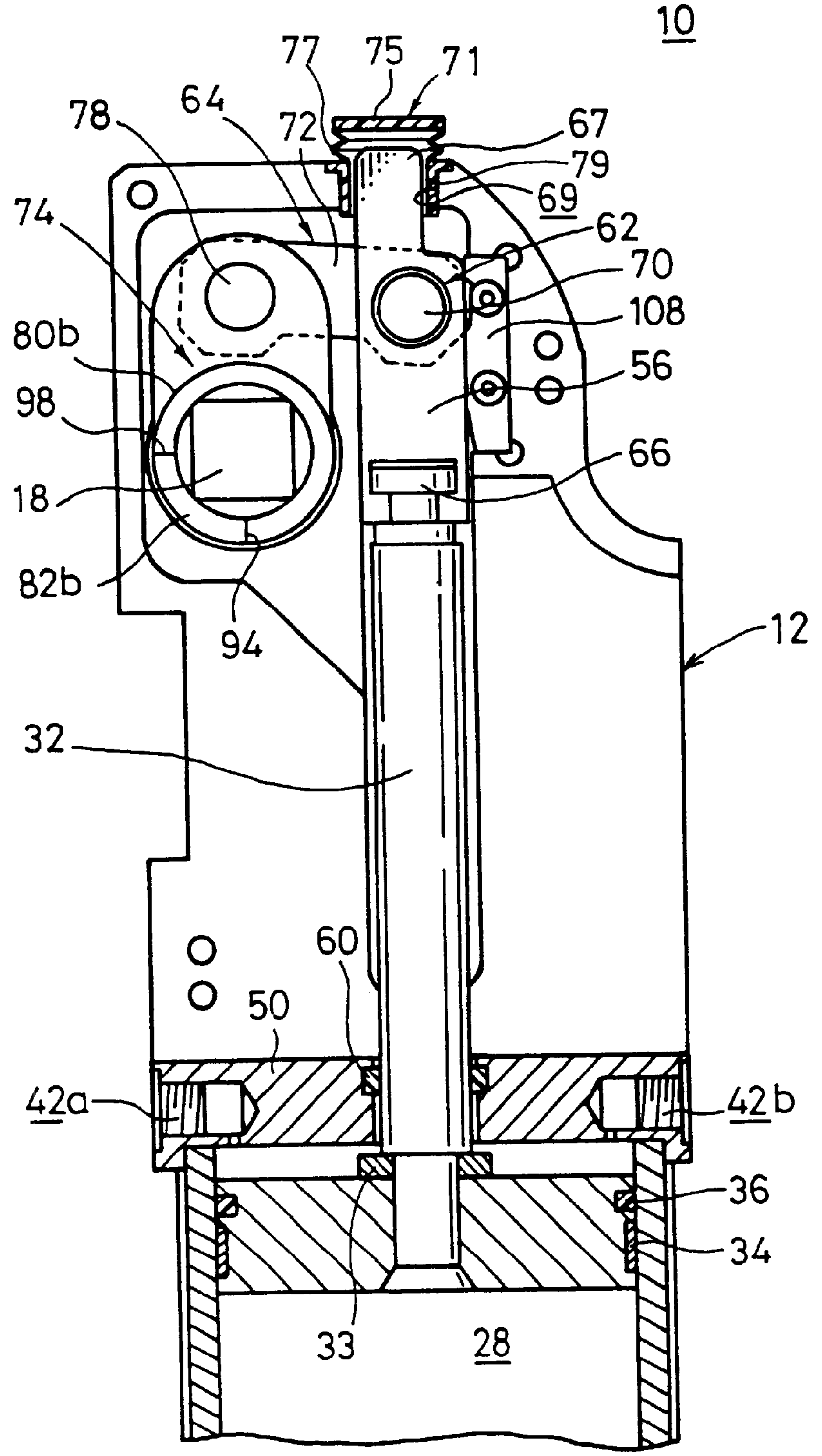
FIG. 8 shows the operation effected when the rotary action of an arm is stopped to give a clamping state.

During the process in which the arm 20 is rotated as described above, the first end surface 94 of the circular arc-shaped projection 82*b* (82*a*) abuts against the first abutment surface 96 of the plate 84*b* (84*a*) which is fixed to the body 12. Accordingly, the arm 20 stops the rotary action. As a result, the clamping state is given, in which the workpiece is clamped by the arm 20 (see FIG. 8). In the clamping state described above, as shown in FIG. 8, the spacer 33, which is provided at the connecting portion between the piston 30 and the piston rod 32, does not abut against the wall surface of the projection 50 which forms the cylinder chamber 28. The reaction force, which is exerted when the unillustrated workpiece is clamped, is received by the reaction force-receiving plate 108 against which the link plate 72 abuts.

After the arm 20 stops the rotary action to give the clamping state, the piston 30 and the piston rod 32 are further moved slightly upwardly and the spacer 33 abuts against the wall surface of the projection 50. Accordingly, the piston 30 and the piston rod 32 are stopped to give the terminal end position of the displacement (see FIG. 3).

In this arrangement, the releasing projection 67, which is formed integrally with the knuckle block 56, protrudes by the predetermined length from the elliptic opening 69 formed at the upper portion of the body 12, and the releasing projection 67 is disposed in the hole in the cap 71. Therefore, when the operator presses the releasing projection 67 via the flexible cap 71 to displace the releasing projection 67 downwardly, the clamping state can be canceled to make restoration to the unclamping state.

On the other hand, when the pressure fluid is supplied to the pressure fluid inlet/outlet port 42*a* in accordance with the switching action of an unillustrated changeover valve in the clamping state, the piston 30 is moved downwardly. Further, the support lever 74 is rotated in a direction opposite to the direction described above by the aid of the link plate 72 in accordance with the downward movement action of the piston rod 32. Accordingly, the arm 20 is rotated in a direction to make separation from the workpiece.

During the process in which the arm 20 is rotated in the direction to make separation from the workpiece, the second end surface 98 of the circular arc-shaped projection 82*b* (82*a*) abuts against the second abutment surface 100 of the plate 84*b* (84*a*) which is fixed to the body 12. Accordingly, the arm 20 stops the rotary action. As a result, the clamp apparatus 10 is restored to the initial position.

In the embodiment of the present invention, the opening 69, in which the releasing projection 67 is to be located, is closed by the cap 71. Accordingly, for example, when the clamped workpiece is welded, it is possible to avoid the invasion of foreign matters such as sputter into the inside of the body 12 via the opening 69. Therefore, it is possible to improve the durability of the toggle link mechanism 64 or the like without being badly affected, for example, such that the sliding resistance is increased by the foreign matters (dust or the like) making invasion into the body 12.

In the embodiment of the present invention, no foreign matter makes invasion into the space between the opening 69 and the releasing projection 67. Accordingly, the displacement of the releasing projection 67 is not obstructed. Therefore, the operator can easily displace the releasing projection 67 by pressing the releasing projection 67 via the flexible cap 71.

In the embodiment of the present invention, the flat plate-shaped releasing projection 67, which protrudes upwardly, is integrally formed on one of the branches of the forked section of the knuckle block 56. Accordingly, it is possible to reduce the number of parts and decrease the production cost as compared with the conventional technique in which the release pin 7 is provided as the separate member.

In the embodiment of the present invention, explanation has been made, in which the cylinder is used as the driving mechanism. However, there is no limitation thereto. It is also preferable that the rod member (piston rod 32) is displaced by using, for example, an unillustrated linear actuator or an electric motor.

Figure 9:
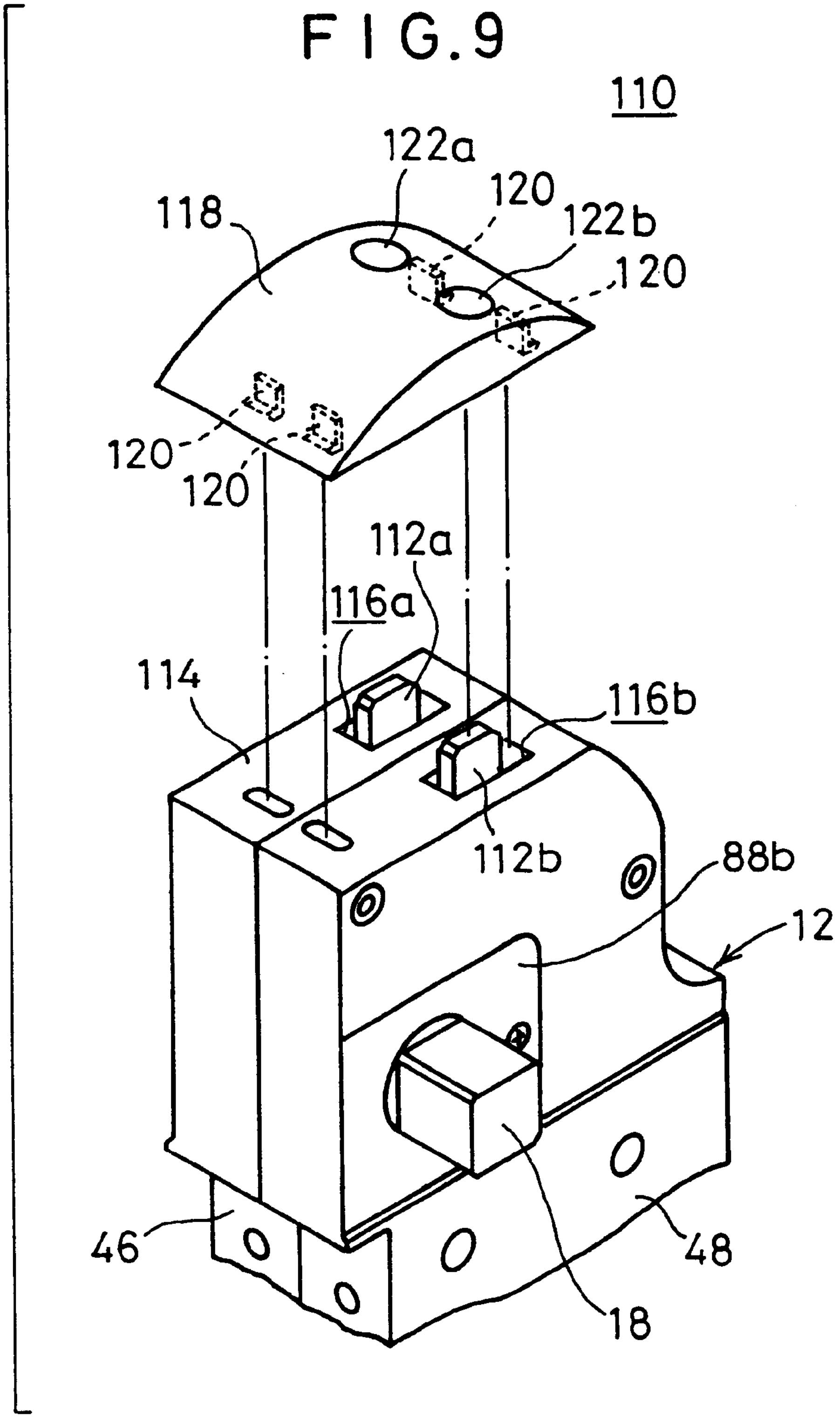
FIG. 9 shows an exploded perspective view illustrating major components of a clamp apparatus according to another embodiment of the present Invention.
Figure 10:
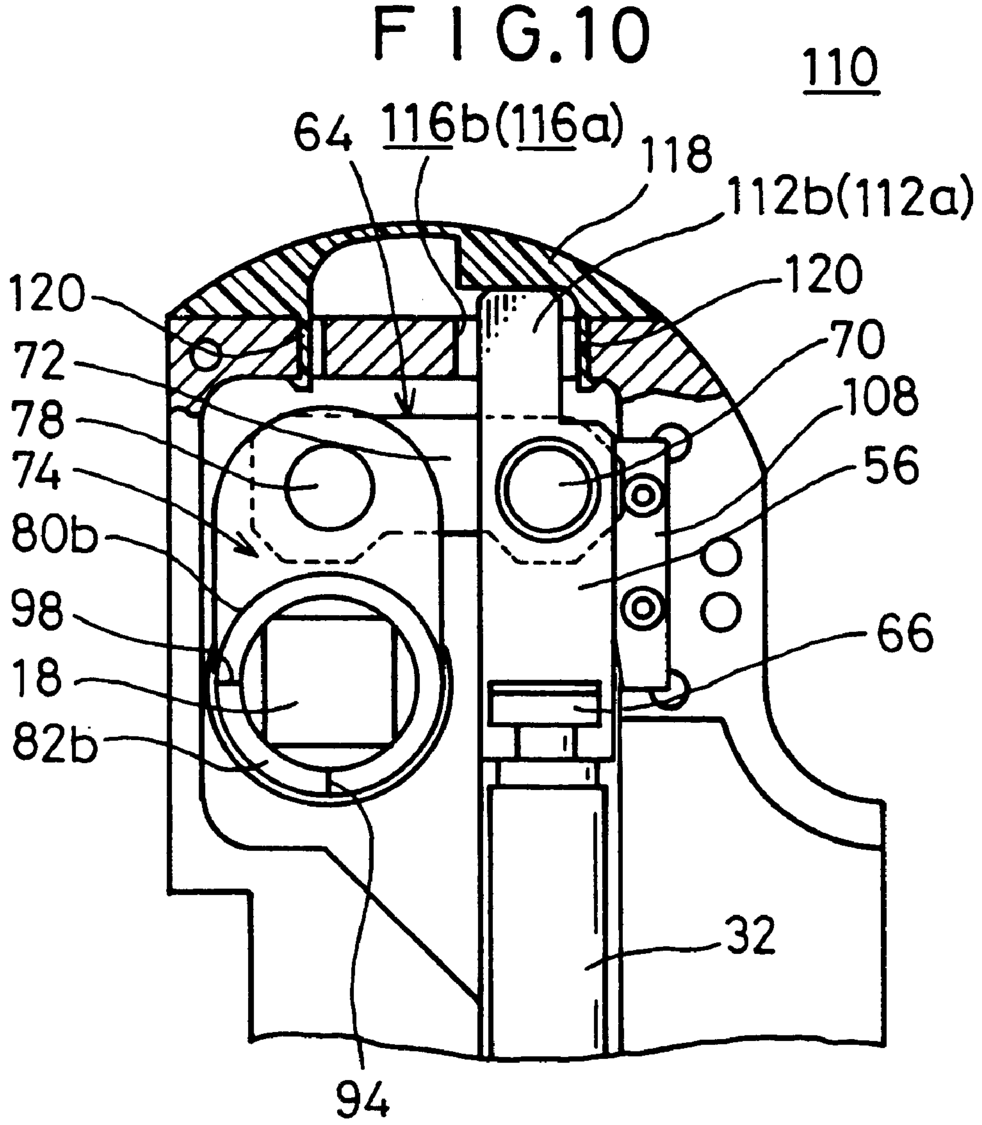
FIG. 10 shows a partial longitudinal sectional view taken in an axial direction of the clamp apparatus shown in FIG. 9.
Figure 11:
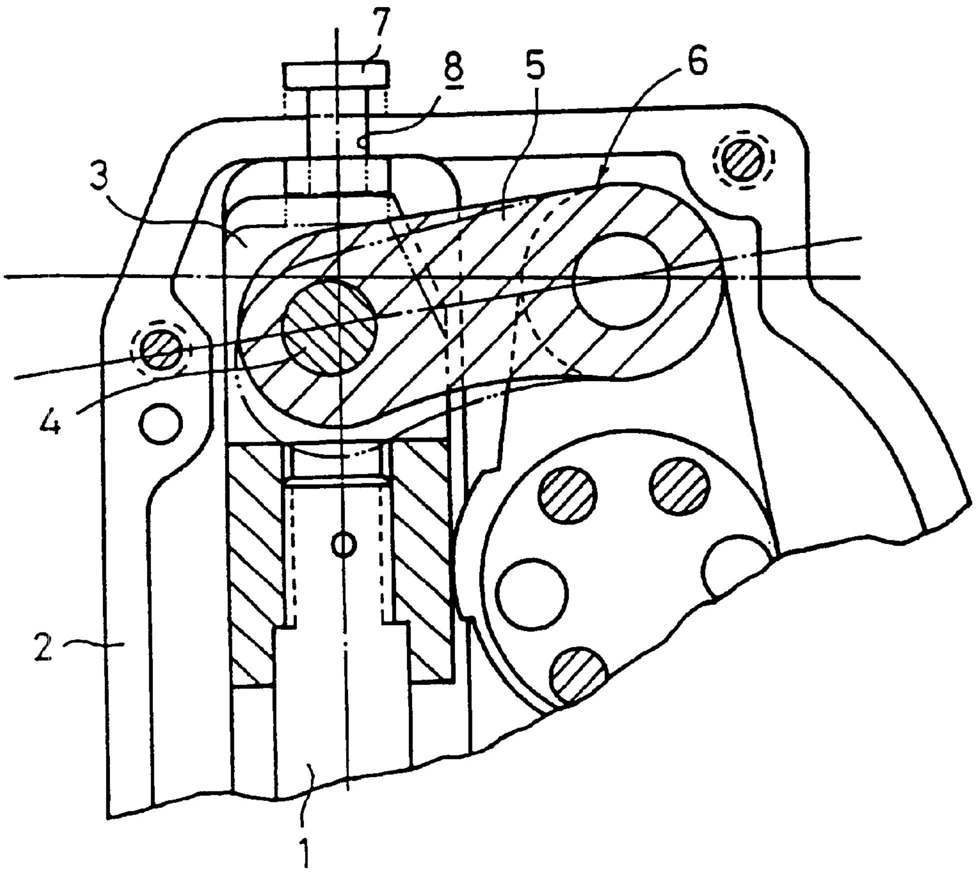
FIG.11 PRIOR ART
FIG. 11 shows a partial longitudinal sectional view illustrating a clamp cylinder concerning the conventional technique.

Next, a clamp apparatus 110 according to another embodiment of the present invention is shown in FIGS. 9 and 10. The same constitutive components as those of the embodiment shown in FIG. 1 described above are designated by the same reference numerals, and the detailed explanation of which will be omitted.

The clamp apparatus 110 according to the another embodiment is characterized in that a pair of flat plate-shaped releasing projections 112*a*, 112*b*, which protrude upwardly substantially in parallel to one another respectively, are integrally formed on both of the branches of the forked section of the knuckle block 56.

Further, the clamp apparatus 110 has the following feature. That is, a flat surface portion 114 is formed at the top of the body 12. First ends of the pair of releasing projections 112*a*, 112*b* are provided to protrude through rectangular holes 116*a*, 116*b* which are formed through the flat surface section 114. A wide-width cap 118, which covers the entire flat surface section 114 of the body 12, is installed. The upper surface of the cap 118 is formed to have a circular arc-shaped cross section. Pawls 120, which are fastened to holes or the like of the body 12, are provided on the lower surface of the cap 118. The cap 118 is made of an elastic material such as those made of synthetic resin and rubber.

The clamp apparatus 110 according to the another embodiment, which is provided with the pair of flat plate-shaped releasing projections 112*a*, 112*b*, is advantageous in that the locked state can be canceled when the operator arbitrarily selects and presses any one of the pair of releasing projections 112*a*, 112*b* depending on the installation environment or the like. Marks 122*a*, 122*b*, each of which is used when any one of the pair of releasing projections 112*a*, 112*b* is pressed, are formed on the upper surface of the cap 118.

The other structure, function, and effect are the same as those of the embodiment described above, detailed explanation of which is omitted.

What is claimed is:

1. A clamp apparatus comprising:

a body;

a driving mechanism for displacing a rod member provided at the inside of said body in an axial direction of said body;

a toggle link mechanism including link members connected to said rod member, for converting rectilinear motion of said rod member into rotary motion; and an arm connected to said toggle link mechanism, for making rotation by a predetermined angle in accordance with a driving action of said driving mechanism, wherein:

said toggle link mechanism includes a releasing projection which protrudes from a hole formed in said body without coming into contact with said body when it is displaced integrally with said rod member, and said body is provided with a seal mechanism which closes said hole and which covers said releasing projection.

2. The clamp apparatus according to claim 1, wherein said toggle link mechanism has a knuckle block for making engagement with one end of said rod member, and said knuckle block is provided with said releasing projection which protrudes in said axial direction.

3. The clamp apparatus according to claim 1, wherein said seal mechanism is composed of a cap which is installed to said hole formed at one end of said body in said axial direction.

4. The clamp apparatus according to claim 3, wherein said cap includes a ceiling section, a bellows section formed to be telescopic, and a cylindrical section for being inserted into said hole, and said ceiling section, said bellows section, and said cylindrical section are made of a flexible material in an integrated manner.

5. The clamp apparatus according to claim 1, wherein said seal mechanism is composed of a cap for covering a flat surface section formed at a top of said body.

6. A clamp apparatus comprising:

a body;

a driving mechanism for displacing a rod member provided at the inside of said body in an axial direction of said body;

a toggle link mechanism including link members connected to said rod member, for converting rectilinear motion of said rod member into rotary motion; and an arm connected to said toggle link mechanism, for making rotation by a predetermined angle in accordance with a driving action of said driving mechanism, wherein:

said toggle link mechanism includes a releasing projection which protrudes from a hole formed in said body when it is displaced integrally with said rod member, and said body is provided with a seal mechanism which closes said hole and which covers said releasing projection;

said toggle link mechanism has a knuckle block for making engagement with one end of said rod member, and said knuckle block is provided with said releasing projection which protrudes in said axial direction; and said releasing projection is provided singly on one of branches of a forked section of said knuckle block.

7. The clamp apparatus according to claim 6, wherein said releasing projection is formed integrally with said knuckle block.

8. A clamp apparatus comprising:

a body;

a driving mechanism for displacing a rod member provided at the inside of said body in an axial direction of said body;

a toggle link mechanism including link members connected to said rod member, for converting rectilinear motion of said rod member into rotary motion; and an arm connected to said toggle link mechanism, for making rotation by a predetermined angle in accordance with a driving action of said driving mechanism, wherein:

said toggle link mechanism includes a releasing projection which protrudes from a hole formed in said body when it is displaced integrally with said rod member, and said body is provided with a seal mechanism which closes said hole and which covers said releasing projection;

said toggle link mechanism has a knuckle block for making engagement with one end of said rod member, and said knuckle block is provided with said releasing projection which protrudes in said axial direction; and a pair of said releasing projections are provided substantially in parallel to one another on branches of a forked section of said knuckle block.

9. The clamp apparatus according to claim 8, wherein said pair of releasing projections are formed integrally with said knuckle block.

10. A clamp apparatus comprising:

a body;

a driving mechanism for displacing a rod member provided at the inside of said body in an axial direction of said body;

a toggle link mechanism including link members connected to said rod member, for converting rectilinear motion of said rod member into rotary motion; and an arm connected to said toggle link mechanism, for making rotation by a predetermined angle in accordance with a driving action of said driving mechanism, wherein:

said toggle link mechanism includes a releasing projection which protrudes from a hole formed in said body when it is displaced integrally with said rod member, and said body is provided with a seal mechanism which closes said hole and which covers said releasing projection, wherein:

said seal mechanism is composed of a cap for covering a flat surface section formed at a top of said body; and wherein:

an upper surface portion of said cap is formed to have a substantially circular arc-shaped cross section, and pawls for being engaged with holes of said body are provided at lower surface portions of said cap.

11. A clamp apparatus comprising:

a body;

a driving mechanism for displacing a rod member provided at the inside of said body in an axial direction of said body;

a toggle link mechanism including link members connected to said rod member, for converting rectilinear motion of said rod member into rotary motion; and an arm connected to said toggle link mechanism, for making rotation by a predetermined angle in accordance with a driving action of said driving mechanism, wherein:

said toggle link mechanism includes a releasing projection which protrudes from a substantially elliptically shaped hole formed in said body when it is displaced integrally with said rod member, and said body is provided with a seal mechanism which closes said hole and which covers said releasing projection; and said seal mechanism is composed of a substantially elliptically shaped cap which is installed to said hole formed at one end of said body in said axial direction, said cap including a substantially elliptically shaped ceiling section, a bellows section formed to be telescopic, and a cylindrical section for being inserted into said hole, wherein said ceiling section, said bellows section, and said cylindrical section are made of a flexible material in an integrated manner, said cap further having a flange between said bellows section and said cylindrical section for abutment against said body, and a lip member at a distal end of said cylindrical section for engagement with a lower edge of said hole.

* * * * *